United States Patent
Smith et al.

(10) Patent No.: US 11,200,689 B1
(45) Date of Patent: Dec. 14, 2021

(54) DETAILED 3D ESTIMATION FROM A SINGLE IMAGE

(71) Applicant: Amazon Technologies, Inc., Seattle, WA (US)

(72) Inventors: David Smith, Brooklyn, NY (US); Javier Romero Gonzalez-Nicolas, Barcelona (ES); Xiaochen Hu, Jersey City, NJ (US); Matthew Maverick Loper, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/448,605

(22) Filed: Jun. 21, 2019

(51) Int. Cl.
*G06T 17/10* (2006.01)
*G06T 7/529* (2017.01)
*G06T 7/90* (2017.01)
*G06T 7/73* (2017.01)
*G06N 3/08* (2006.01)

(52) U.S. Cl.
CPC .............. *G06T 7/529* (2017.01); *G06N 3/08* (2013.01); *G06T 7/73* (2017.01); *G06T 7/90* (2017.01); *G06T 17/10* (2013.01)

(58) Field of Classification Search
CPC .......... G06T 7/529; G06T 7/90; G06T 17/10; G06T 7/73; G06N 3/08
See application file for complete search history.

(56) References Cited

U.S. PATENT DOCUMENTS

| 8,745,514 B1 * | 6/2014 | Davidson | G06F 3/04842 715/766 |
| 2014/0071234 A1 * | 3/2014 | Millett | G01S 17/894 348/43 |

\* cited by examiner

*Primary Examiner* — Said Broome
(74) *Attorney, Agent, or Firm* — Pierce Atwood LLP

(57) ABSTRACT

A system configured to perform an accurate and fast estimation of an object shape from a single input image. The system may process image data representing a first surface of an object using image-to-image translation techniques. A first trained model may generate depth information for the object, such as front distance estimates and back distance estimates. The system may use the depth information to generate an output mesh shaped like the object, such as, in the case of a pliable object a reposable avatar. The system may improve depth estimation by including a loss on surface normals in the first trained model. A second trained model may generate color information to be applied to the output mesh to accurately represent the object. The output mesh may include detailed geometry and appearance of the object, useful for a variety of purposes such as gaming, virtual/augmented reality, virtual shopping, and other implementations.

21 Claims, 11 Drawing Sheets

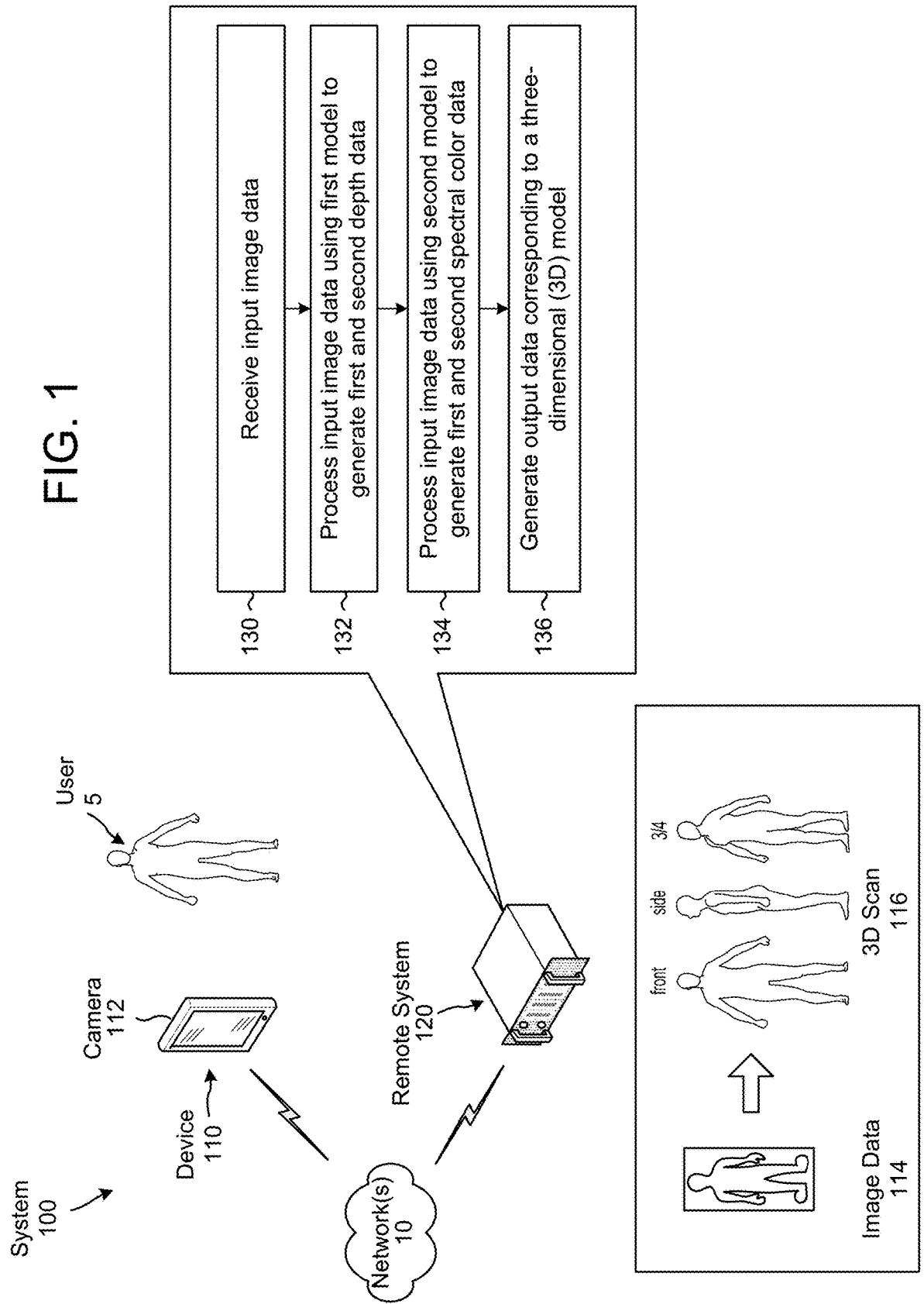

FIG. 3
Without Loss on
Surface Normals
310
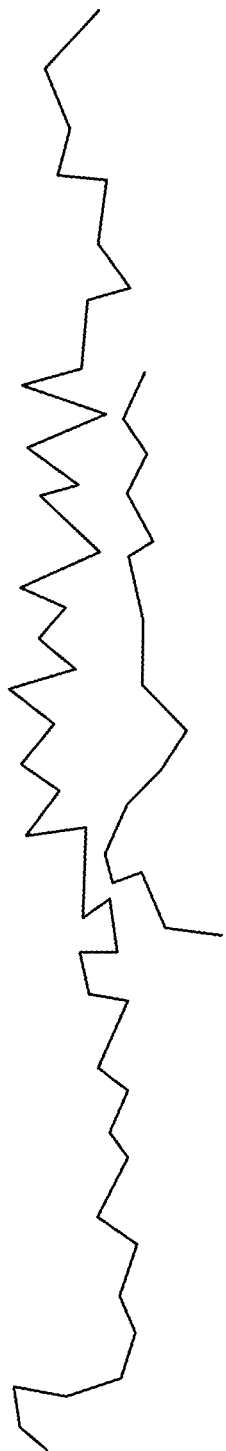
With Loss on
Surface Normals
320
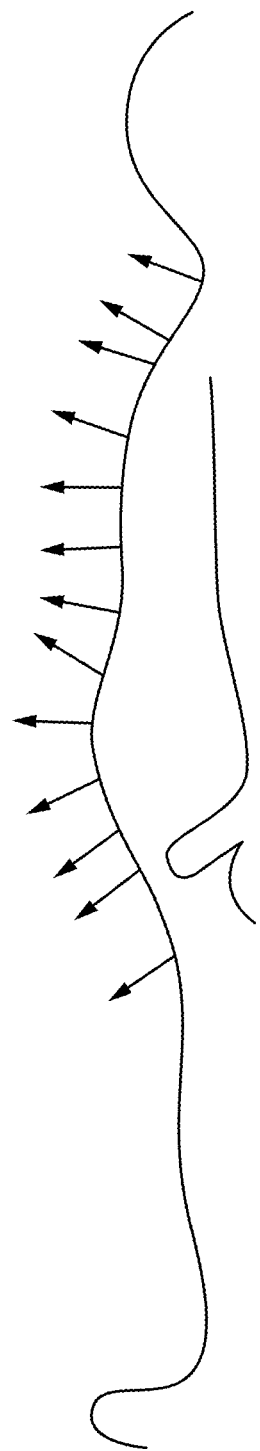

FIG. 9
Input Image Data
930
Virtual Image Data
940
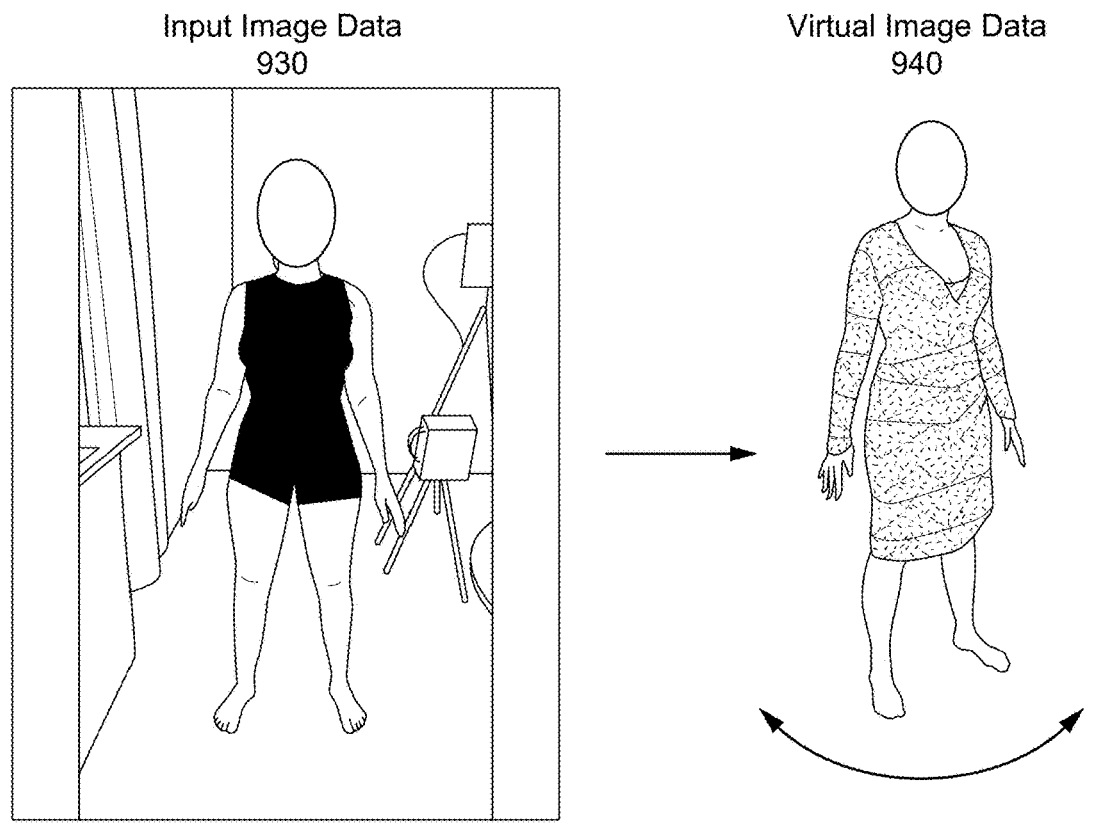
Input Image Data
910
Avatar Data
920
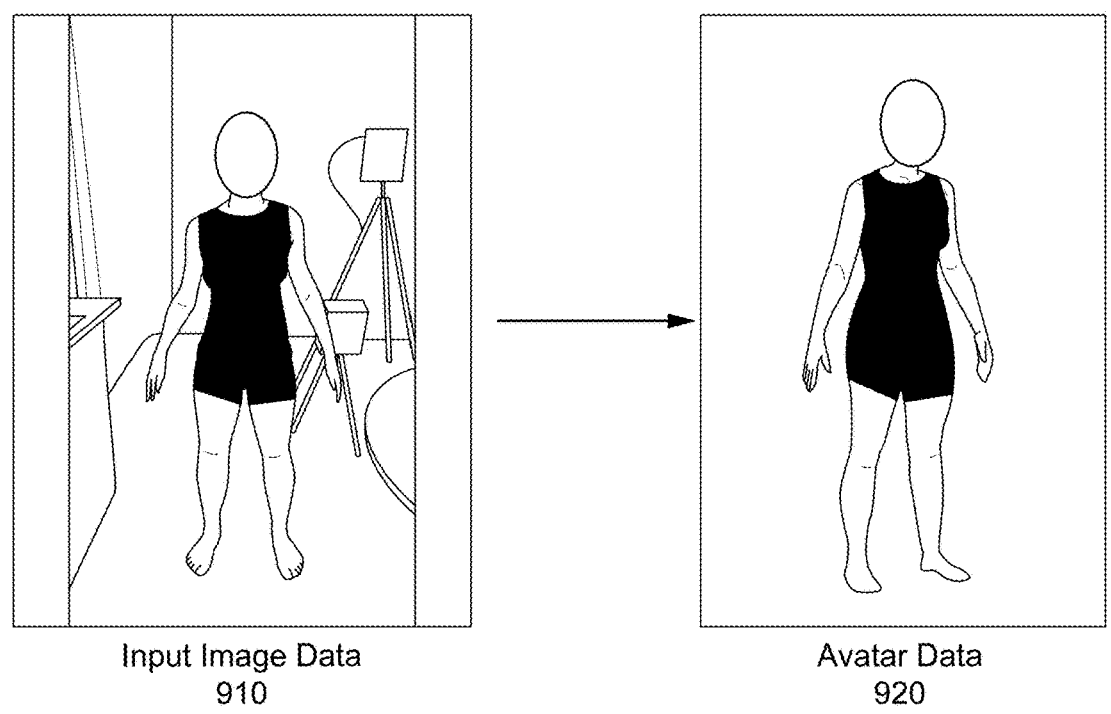

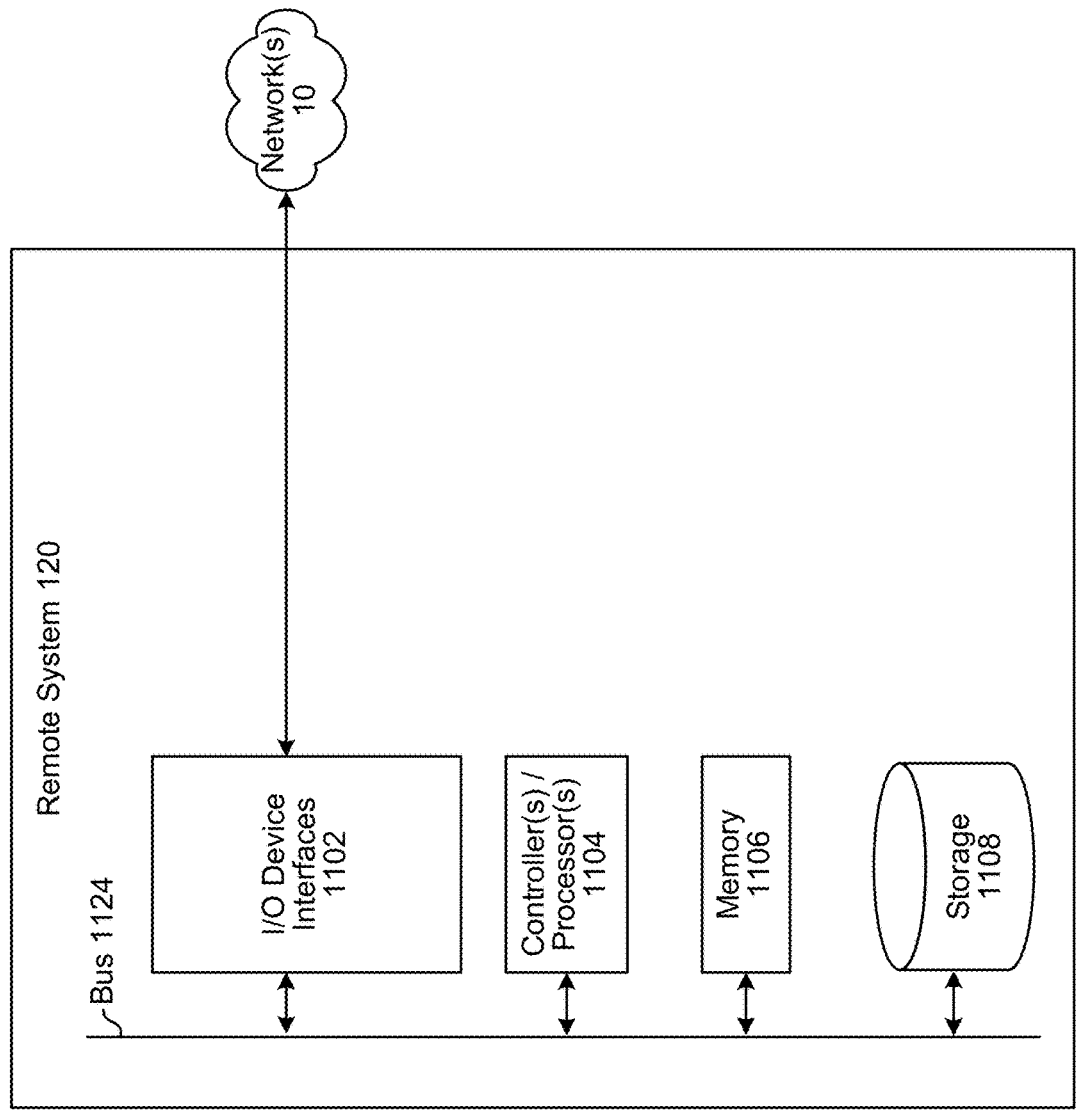

DETAILED 3D ESTIMATION FROM A SINGLE IMAGE

BACKGROUND

With the advancement of technology, the use and popularity of electronic devices has increased considerably. Electronic devices are commonly used to capture and process image data.

BRIEF DESCRIPTION OF DRAWINGS

For a more complete understanding of the present disclosure, reference is now made to the following description taken in conjunction with the accompanying drawings.

FIG. 1 illustrates a system according to embodiments of the present disclosure.

FIG. 3 illustrates an example of improving an estimate of depth data using surface normal values according to embodiments of the present disclosure.

FIG. 9 illustrates examples of virtual image data and avatar data according to embodiments of the present disclosure.

FIG. 11 is a block diagram conceptually illustrating example components of a remote system according to embodiments of the present disclosure.

DETAILED DESCRIPTION

Figure 2A:
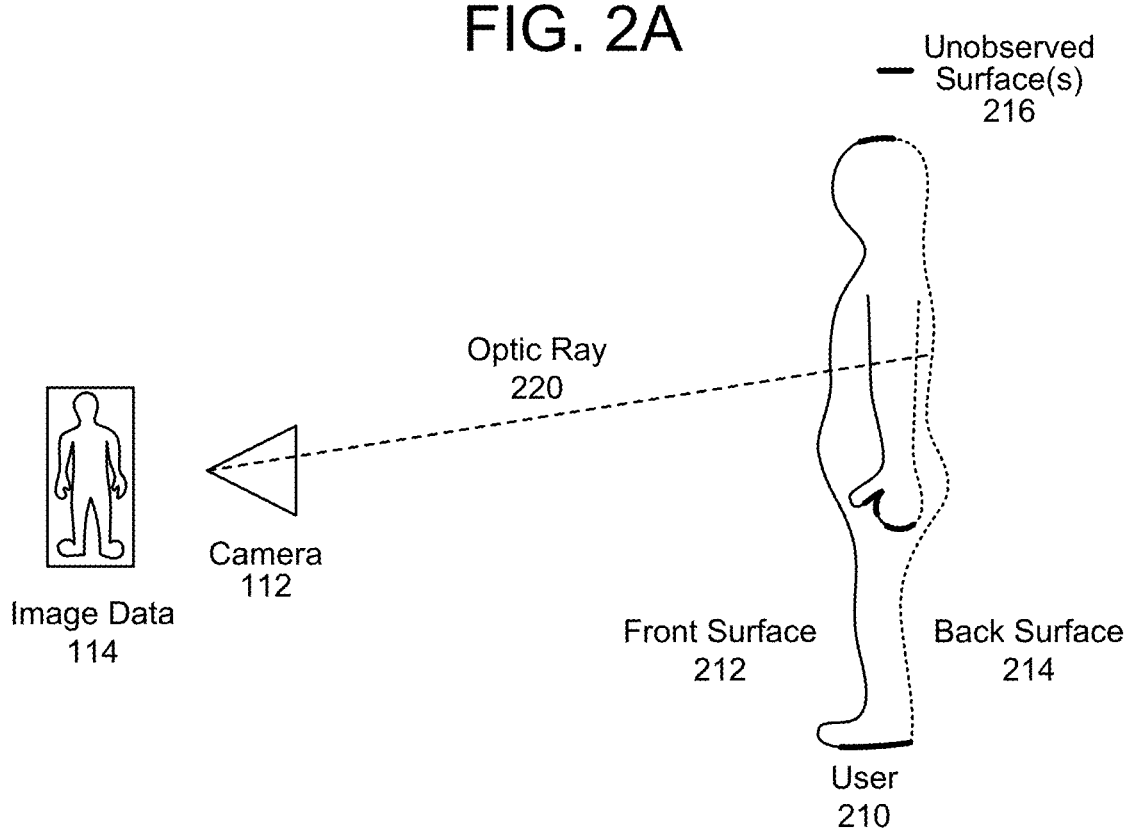
FIGS. 2A-2B illustrate an example of determining depth data from input image data according to embodiments of the present disclosure.

Electronic devices may be used to capture and process image data. The image data may be used for a variety of purposes, including body shape estimation. Conventional techniques for body shape estimation either lack detail or require multiple images. For example, to acquire sufficient detail, conventional techniques may capture images from multiple angles, whether using multiple cameras or having a user pose multiple times for a single camera. In addition, conventional techniques may require a known, calibrated environment in order to generate an accurate estimate.

Alternatively, other conventional techniques perform a three-dimensional (3D) full body scan using a 3D scanner, distance sensor, or the like to generate a 3D mesh model of the body. However, as the human body is complex, a number of vertices in the 3D mesh model is often large. For example, laser range scans may include upwards often thousand or even one hundred thousand such vertices, resulting in a large computational processing requirement. To reduce the computational processing requirement, some conventional techniques use a lower resolution grid (e.g., coarse or sparse grid), which reduces the amount of detail represented.

To improve a user experience and reduce computational processing required to perform body shape estimation, devices, systems and methods are disclosed that may perform an accurate and fast estimation of a body shape from a single input image. If a user desires, a system can offer services that allow the user to create a three dimensional model of an object, such as the user's body, which may assist the user in further activities such as virtually trying on certain clothing, footwear, etc. before purchase, representing the user in a computer game or other virtual reality (VR) or augmented reality (AR) situation, or the like. If the user opts-in to the process, the system may generate image data representing a front surface of a user (e.g., frontal pose) and may process the image data using two different trained models. A first trained model may generate depth information, such as first distance estimates indicating how far the front of the user is from the camera as well as second distance estimates indicating how far the back of the user is from the camera. The system may use the depth information to generate an output mesh shaped like the person, such as a reposable human avatar. A second trained model may generate color information (e.g., albedo inference information), which the system may apply to the output mesh to accurately represent the user. The avatar may include detailed geometry and appearance of the person, which is useful for gaming (e.g., avatar extraction), virtual telepresence, virtual shopping (e.g., clothing size prediction, virtual fitting rooms, etc.) and other implementations.

To reduce a computational complexity required to perform body shape estimation, the system may use image-to-image translation techniques to generate the depth information and/or the color information. For example, the system may generate the depth information, the color information, and/or a combination of the two as one or more images, with individual pixels indicating depth information and/or color information associated with a specific position on the front and back surface of the user. In addition, the system may improve the depth estimation and smooth three-dimensional (3D) surfaces of the output mesh by including a loss on surface normals in the first trained model. As a result, the system may perform body shape estimation and/or generate a detailed reposable human avatar from a single color image captured by an uncalibrated camera such as a smartphone, improving a user experience.

Although the system below focuses on the example of creating a simulated 3D model for a body, the techniques herein may also be used to create 3D models from single facing images for other objects such as furniture, appliances, etc. In such cases the models and components described below may be trained with respect to those objects so that accurate 3D models may be created based on 2D images. 3D images of such objects created according to the present techniques may be used, for example, in assisting a user in simulating, prior to purchase how furniture, rugs, lamps, paintings, or other objects may fit in a 3D representation of the user's home. 3D images of objects created according to the present techniques may also be used, for example, in assisting vehicles used for navigation, for example simulating such objects for vehicle training, etc.

The task of navigating a large electronic catalog of items (e.g., a catalog with thousands, millions, or billions of items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest.

The 3D models determined using the techniques described herein along with associated recommendation algorithms and user interfaces significantly reduce this problem, allowing users to locate items of interest with fewer steps. For example, when the user is presented with one or more item recommendations, each item recommendation includes, or is in the form of, a link to the catalog's item detail page for the corresponding item, allowing the user to navigate directly to this page. Each recommendation thus serves as a programmatically selected navigational shortcut to the item's detail page or description, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages to locate the recommended items via the browse tree or via searching. This can be particularly true for computing devices with small screens, where fewer items can be displayed to the user at a time and thus navigation of larger volumes of items is more difficult.

FIG. 1 illustrates a high-level conceptual block diagram of a system 100 configured to perform body shape estimation to estimate a human body shape from a single input image according to embodiments of the present disclosure. Although FIG. 1, and other figures/discussion illustrate the operation of the system in a particular order, the steps described may be performed in a different order (as well as certain steps removed or added) without departing from the intent of the disclosure. A plurality of devices may communicate across one or more network(s) 10. For example, FIG. 1 illustrates an example of a device 110 local to a user 5 communicating with a remote system 120 via the network(s) 10.

As illustrated in FIG. 1, the device 110 may include a camera 112 and the device 110 may, if the user desires, capture an image of the user 5 using the camera 112. For example, the camera 112 may generate image data 114 that includes a representation of the user 5. As will be described in greater detail below, the system 100 may process the image data 114 to perform body shape estimation (e.g., "body estimation") to estimate a human body shape corresponding to the user 5. For example, the device 110 may send the image data 114 to the remote system 120 via the network(s) 10 and the remote system 120 may process the image data 114 to generate a three-dimensional (3D) scan 116, as illustrated in FIG. 1. Thus, the system 100 may provide an accurate and fast estimation of a body shape of the user 5 from a single input image (e.g., image data 114), without requiring a full body 3D scan or multiple images of the user 5 from different angles.

In some examples, the 3D scan 116 may correspond to a detailed reposable human avatar that includes detailed geometry and appearance of the person. For example, the 3D scan 116 may represent the user 5 using 3D surfaces and may include color information corresponding to the user 5. However, the disclosure is not limited thereto and output data generated by the system 100 may vary without departing from the disclosure. For example, the system 100 may generate intermediate representation data that includes depth information and/or color information that may be used to generate the 3D scan 116 at a later time and/or by a remote device. For example, the depth information may indicate a distance between an individual pixel in the image data 114 and the camera 112, which may be trivially triangulated to create a 3D surface using techniques known to one of skill in the art.

For ease of illustration, an output of the system 100, whether intermediate representation data or the 3D scan 116 illustrated in FIG. 1, may be referred to as a 3D scan, 3D model, human avatar, output mesh, and/or the like without departing from the disclosure. However, while these terms are closely related, there are slight differences between them and therefore these terms may have a specific meaning. For example, the system 100 may generate depth information corresponding to a point cloud (e.g., plurality of data points), which may be referred to as the scan. The system 100 may then perform an alignment process to deform a set of free body vertices (referred to as the mesh) so that they are close to the point cloud while also being likely according to a statistical model of human shape and pose. Thus, the scan (e.g., 3D scan) may refer to the depth information inferred from the input image data, with or without color information, whereas the mesh (e.g., output mesh, 3D model, human avatar) may refer to a deformable model or reposable avatar.

The 3D scan 116 and/or the intermediate representation data has multiple potential applications, including virtual shopping (e.g., virtual try-on), clothing size prediction, avatar extraction for gaming, virtual telepresence, medicine, and/or the like.

The camera 112 may include an image sensor configured to generate the image data 114 using any technique known to one of skill in the art. While FIG. 1 illustrates the device 110 including a single camera 112 that is internal to the device 110, the disclosure is not limited thereto and the device 110 may include multiple cameras 112 and/or may be communicatively coupled to an external camera 112 without departing from the disclosure. Additionally or alternatively, the device 110 may include additional components not illustrated in FIG. 1 without departing from the disclosure.

While FIG. 1 illustrates the device 110 sending the image data 114 to the remote system 120 and the remote system 120 processing the image data 114 to generate the 3D scan 116, the disclosure is not limited thereto. Instead, the device 110 may process the image data 114 to generate the intermediate representation data and/or generate the 3D scan 116 locally without departing from the disclosure.

As illustrated in FIG. 1, the system 100 may receive (130) input image data (e.g., image data 114). Such input image data may correspond to a two-dimensional representation of an object. If a user has indicated their permission and requested that the system assist in creating a 3D representation of the user, the input image data may include a two-dimensional representation of the user 5. For example, the input image data may represent the user 5 in a frontal pose, although the disclosure is not limited thereto. In some examples, the input image data may represent the user 5 in an arms-down frontal pose with clothing that allows an accurate representation of the user's body contours (for example for clothing fitting purposes), although the pose, clothing, and/or position of the arms may vary without departing from the disclosure.

The system 100 may process (132) the input image data using a first model to generate first and second depth data, as will be described in greater detail below with regard to FIGS. 2A-5. For example, the first depth data may correspond to the depth of a front face of an object and the second depth data may correspond to the depth of a rear face of an object. The first model is trained to perform depth estimation from a single image and may be referred to as a trained model, a deep neural network (DNN), and/or machine learning model without departing from the disclosure. For example, the first model may be trained using a plurality of training images (collectively, training data) in order to accurately estimate the depth data based only on pixel values included in the input image data. Thus, the first model does not receive additional inputs such as distance values generated by a depth sensor, second image data generated by a second camera, second image data representing the user 5 in a different pose and/or from a different angle, or the like.

The first model may be trained to identify a portion of the input image data that is associated with the user 5 and generate two depth estimate values (e.g., front depth estimate and back depth estimate) for each pixel included in the portion of the input image data. For example, the first model may implicitly learn to exclude a background of the input image data, identifying the user 5 in a foreground of the input image data and generating mask data indicating a plurality of pixels associated with the user 5. Based on the pixel values of the plurality of pixels, the first model may generate front depth estimate values (e.g., front depth data) that correspond to an estimated distance between the camera 112 and a front surface of the user 5 for each of the plurality of pixels. Similarly, the first model may generate back depth estimate values (e.g., back depth data) that correspond to an estimated distance between the camera 112 and a back surface of the user 5 for each of the plurality of pixels. Thus, the first model hypothesizes the back side of the user 5 based on the input image data.

As the depth data is estimated for individual pixels, training the first model using only a loss on depth results in large variations in the estimated distances between neighboring pixels, which corresponds to irregular surfaces in a 3D scan (e.g., output mesh). To improve the depth estimates and smooth corresponding surfaces in the 3D scan, the first model attempts to infer local surface geometry by including a loss on surface normals. Surface normals play a critical role in defining a relationship between a surface and its appearance. Therefore, by including the loss on surface normals (e.g., least absolute deviations (L1) loss on normals) in an optimization equation of the first model, the system 100 may estimate detailed body geometry without any depth supervision.

As used herein, a surface normal indicates an orientation of the surface of the user 5 at a particular position and can be calculated directly based on the depth data using a fixed function (e.g., the first model is not trained to calculate the surface normals). For example, the surface normal for a particular position may be represented using a normalized vector having three channels (e.g., x-y-z coordinate values) that indicate a direction that the surface is pointing at the particular position. The first model may calculate the surface normal using a grid of pixel values (e.g., 3×3 grid, 6×6 grid, etc.) centered on the particular position, although the disclosure is not limited thereto and the surface normal may be generated using any technique known to one of skill in the art. To illustrate simple examples, if the surface is pointing to the right along the x-axis the first model may generate a first surface normal represented by a first normalized vector (1, 0, 0), whereas if the surface is pointing to the left along the x-axis the first model may generate a second surface normal represented by a second normalized vector (−1, 0, 0).

As a smooth surface has a relatively consistent orientation, neighboring pixels along the smooth surface should have relatively similar surface normals. By including the loss on surface normals, the first model generates distance estimates with less variation between neighboring pixels, which results in smoother (e.g., less wrinkly) surfaces in a corresponding 3D scan. Thus, the first model is introducing an additional penalty to the optimization function that makes the estimated distance values more smooth and the 3D scan more lifelike (e.g., surface normals are used to penalize certain properties of the depth estimates). This enables the system 100 to focus on local detail instead of a global idea of depth, such that the depth data represents not just a position of the user 5, but also curvature and orientation of the user 5. Additional details about the first model and generating the depth data will be included below with regard to FIGS. 2A-5.

The front depth data and the back depth data indicate estimated distance values associated with a front surface and a back surface of the user 5 and can be used to generate a 3D scan corresponding to the user 5. In order to accurately represent the user 5, the system 100 may also estimate color information with which to apply to the 3D scan. For example, the system 100 may use techniques known to one of skill in the art to estimate color information of the user 5 based on the input image data. Estimating the color information may be referred to as albedo estimation or albedo inference, which is a known problem in computer vision.

As illustrated in FIG. 1, the system 100 may process (134) the input image data using a second model to generate first and second spectral color data, as will be described in greater detail below with regard to FIG. 6. For example, the first spectral color data may correspond to albedo color data corresponding to the front surface of the object (e.g., user 5), whereas the second spectral color data may correspond to albedo color data corresponding to the back surface of the object (e.g., user 5). The second model is trained to perform color estimation from a single image and may be referred to as a trained model, a deep neural network, and/or a machine learning model without departing from the disclosure. For example, the second model may be trained using a plurality of training images (collectively, training data) in order to accurately estimate the color data based only on pixel values included in the input image data. Similar to the first model, the second model hypothesizes the back side of the user 5 based on the input image data.

As will be described in greater detail below with regard to FIG. 6, the color data generated by the system 100 corresponds to an estimate of albedo for the user 5 or other object(s) (e.g., articles of clothing) represented in the input image data. As used herein, albedo refers to an intrinsic color value associated with an object, after compensating for shadows, additional lighting, specular highlights, and/or other lighting adjustments that may be present in the input image data (e.g., material color in diffuse lighting conditions with no shadows). For example, the system 100 may generate the same color data when processing first image data representing a brightly lit scene and second image data representing a dark scene, despite the actual color values of the first image data being different than the second image data. For ease of explanation, the following description may refer to the estimate of albedo as color information or color data, despite the estimate of albedo being different from the actual pixel values represented in the input image data.

Using the front depth data, the back depth data, the front color data, and the back color data, the system 100 may generate (136) output data corresponding to a three-dimensional (3D) model. For example, the system 100 may combine the front depth data and the front color data to estimate a front portion of the 3D scan 116, may combine the back depth data and the back color data to estimate a back portion of the 3D scan 116, may scale the front portion to the back portion or vice versa, and may combine the front portion and the back portion in order to generate the 3D scan 116. However, the disclosure is not limited thereto and the system 100 may generate the 3D model using any technique known to one of skill in the art.

In some examples, the system 100 may output the 3D scan 116 to the user 5. For example, the 3D scan 116 may be graphically presented on an output device (e.g. computer monitor, hand-held screen, television, etc.) as a deformable model (e.g., reposable avatar) in either static or animated form. In some examples, the 3D scan 116 may be optionally clothed with virtual garments, although the disclosure is not limited thereto. The 3D scan 116 may include detailed geometry and appearance of the person, which is useful for gaming (e.g., avatar extraction), virtual telepresence, virtual shopping (e.g., clothing size prediction, virtual fitting rooms, etc.) and other implementations.

While FIG. 1 illustrates the system 100 generating the 3D scan 116, the disclosure is not limited thereto. Instead, the system 100 may generate intermediate representation data corresponding to the depth data and/or the color data and may send the intermediate representation data to a remote device for further processing. For example, the system 100 may represent the depth data using two images (e.g., first image data representing first estimated distance values associated with the front surface of the user 5, second image data representing second estimated distance values associated with the back surface of the user 5) or two channels in a single image (e.g., image data including a first channel representing the first estimated distance values and a second channel representing the second estimated distance values). The estimated distance values may be represented as floating point values in the image data, although the disclosure is not limited thereto.

Similarly, the system 100 may represent the color data using two images; first image data representing first color values associated with the front surface of the user 5 and second image data representing second color values associated with the back surface of the user 5. The image data may include three channels corresponding to Red, Green, Blue (RGB) values, which may be represented as integer values, although the disclosure is not limited thereto.

In some examples, the intermediate representation data may combine the depth data and the color data into a single image. For example, the system 100 may generate output image data that includes two channels for the depth data (e.g., first channel representing the first estimated distance values and a second channel representing the second estimated distance values), three channels for the front color data (e.g., third channel representing red intensity values, fourth channel representing green intensity values, and fifth channel representing blue intensity values), and three channels for the back color data (e.g., sixth channel representing red intensity values, seventh channel representing green intensity values, and eighth channel representing blue intensity values). The system 100 may use the output image data to generate the 3D scan 116 using techniques known to one of skill in the art without departing from the disclosure.

As used herein, the image data generated by the camera 112 may correspond to standard digital camera images (e.g., generated by smartphone cameras) and/or may be acquired outside a controlled environment, making camera calibration parameters (e.g., internal properties and position and orientation in the world) unknown. For example, the system 100 may not have information about the camera's location in the world (i.e. the camera is un-calibrated), although the disclosure is not limited thereto.

The camera 112 may include standard digital image sensors (e.g. charge-coupled device (CCD) and/or complementary metal oxide semiconductor (CMOS)) operating in the visible spectrum, although sensors working in the non-visible spectrum may also be used without departing from the disclosure. The camera 112 may perform image capture by generating image data and storing the image data to memory or to a disk (e.g., hard drive). The system 100 may perform image processing on the image data using any techniques known to one of skill in the art. It is assumed that Red-Green-Blue (RGB) input pixels (e.g., $\{r_i, g_i, b_i\}$) in the image data are constrained to the range [0, 1] by the image sensor, but if this is not true (e.g., 8-bit pixel data), the system 100 may rescale the input pixel values to the range [0, 1].

While not illustrated in FIG. 1, the system 100 may perform image segmentation to separate foreground regions (e.g., plurality of pixels corresponding to the user 5) from background regions of the image data using any technique known to one of skill in the art. Additionally or alternatively, the system 100 may use any techniques known to one of skill in the art to identify regions corresponding to skin, clothing, and/or hair. Thus, the system 100 may optionally detect regions of the image data that correspond to the skin, clothing, and/or hair regions associated with the user 5.

To recover body shape, the system 100 may employ a parametric 3D model of the human body. As used herein, the term "body shape" means a pose independent representation that characterizes the fixed skeletal structure (e.g. length of the bones) and the distribution of soft tissue (muscle and fat). The phrase "parametric model" may refer to any 3D body model where the shape and pose of the body are determined by a few parameters. A graphics model is used that is represented as a triangulated mesh (other types of explicit meshes are possible such as quadrilateral meshes as are implicit surface models). A parametric 3D model may be a deformable, triangulated mesh model of the human body that accounts for different body shapes, different poses, and non-rigid deformations due to articulation A database of body scan information may be obtained or generated. For example, the system 100 may access one or more databases that are commercially available. In some examples, given a database of 3D laser ranges scans of human bodies, the system 100 may align the bodies and then apply statistical learning methods within a statistical learning system (e.g., trained model) to learn a low-dimensional parametric body model that captures the variability in shape across people and poses.

The trained model and other models described herein, which are implemented by components of the system, may be trained and operated according to various machine-learning techniques. Such techniques may include, for example, neural networks (such as deep neural networks (DNNs) and/or recurrent neural networks (RNNs)), inference engines, and trained classifiers. Examples of trained classifiers include Support Vector Machines (SVMs), neural networks, decision trees, adaptive boosting (AdaBoost) combined with decision trees, and random forests. For example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 2B:
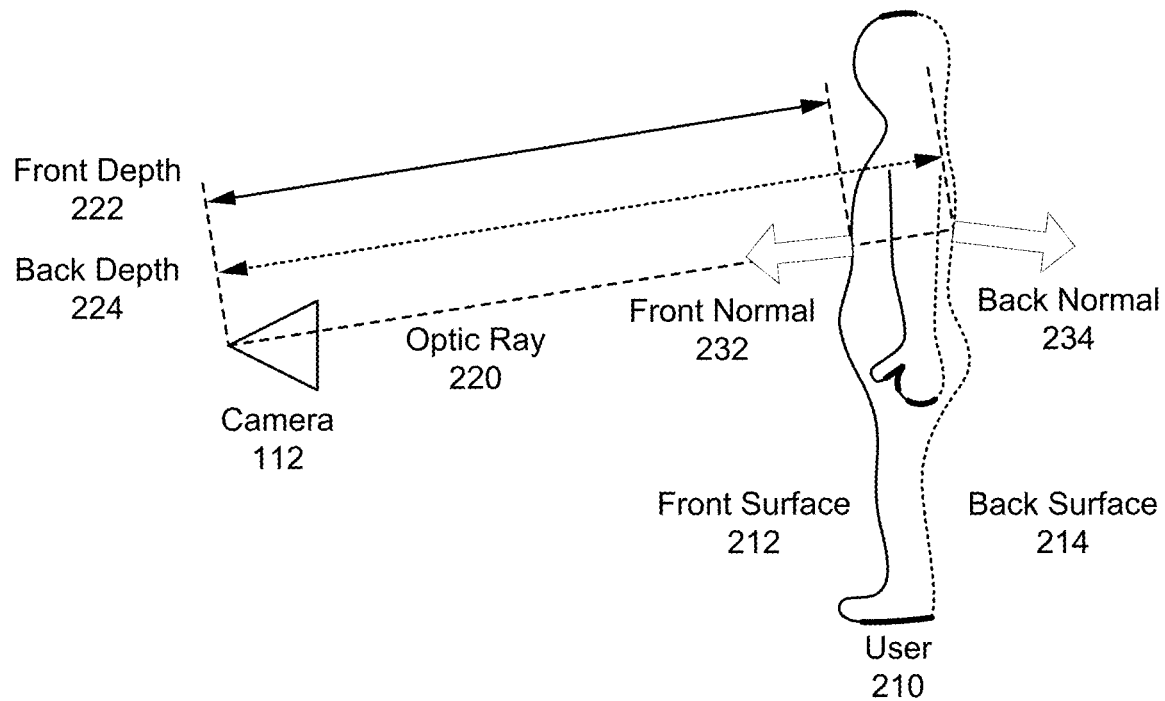

FIGS. 2A-2B illustrate an example of determining depth data from input image data according to embodiments of the present disclosure. As described above, the system 100 may determine depth data based on the image data 114 generated by the camera 112. For example, a user 210 may be represented in a portion of the image data 114 and the system 100 may identify a plurality of pixels included in the portion of the image data 114 (e.g., plurality of pixels in which the user 210 is represented). In some examples, the system 100 may process the image data 114 using a first model that may implicitly learn to exclude a background of the image data 114, identifying the user 210 in a foreground of the image data 114 and generating mask data indicating the plurality of pixels associated with the user 210.

For each pixel of the plurality of pixels, the system 100 may estimate a first distance between the camera 112 and a front surface 212 of the user 210 that is represented in the image data 114. In addition, while only the front surface 212 is represented in the image data 114, the system 100 may also estimate a second distance between the camera 112 and a back surface 214 of the user 210 for each pixel. Thus, the first model hypothesizes the back surface 214 based on the image data 114. To visualize this process, each pixel in the image data 114 can be approximated as corresponding to an optic ray captured by an image sensor included in the camera 112. Thus, the plurality of pixels that represent the user 210 correspond to a plurality of optic rays extending from the camera 112 to the user 210.

FIG. 2A illustrates an example of a single optic ray 220 that corresponds to a single pixel in the image data 114. As illustrated in FIG. 2A, the optic ray 220 extends from the camera 112 to the user 210 and intersects a body of the user 210 in two places: a first position on the front surface 212 and a second position on the back surface 214. Thus, each pixel in the image data 114 corresponds to two separate positions. As illustrated in FIG. 2B, the system 100 may estimate a first distance value (e.g., front depth 222) corresponding to the first position on the front surface 212 and may estimate a second distance value (e.g., back depth 224) corresponding to the second position on the back surface 214.

The system 100 determines the depth data based on an assumption that each optic ray intersects the body of the user 210 only twice; once along the front surface 212 and once along the back surface 214. However, some optic rays intersect the body of the user 210 more than twice, which is illustrated in FIG. 2A as unobserved surface(s) 216. For example, portions of the user 210 that are parallel to the optic ray (e.g., top of a head of the user 210, bottom of feet of the user 210) and/or portions of the user 210 that include more than two surfaces (e.g., a hand of the user 210 if fingers overlap) are represented as unobserved surface(s) 216. While the system 100 does not explicitly estimate distance values associated with the unobserved surface(s) 216, the system 100 may compensate for these gaps or "holes" when generating the output data using a 3D model of the human body.

The first model is trained to perform depth estimation from a single image and may be referred to as a trained model, a deep neural network (DNN), and/or machine learning model without departing from the disclosure. For example, the first model may be trained using a plurality of training images (collectively, training data) in order to accurately estimate the depth data based only on pixel values included in the input image data. Thus, the first model does not receive additional inputs such as distance values generated by a depth sensor, second image data generated by a second camera, second image data representing the user 210 in a different pose and/or from a different angle, or the like.

To determine the front depth 222 and the back depth 224, the system 100 may estimate surface normals associated with the front surface 212 and the back surface 214. For example, FIG. 2B illustrates a front normal 232 corresponding to the first position, which is used to estimate the front depth 222, and a back normal 234 corresponding to the second position, which is used to estimate the back depth 224.

FIG. 3 illustrates an example of improving an estimate of depth data using surface normal values according to embodiments of the present disclosure. As the depth data is estimated for individual pixels, training the first model using only a loss on depth may result in large variations in the estimated distances between neighboring pixels, which corresponds to irregular surfaces in a 3D scan (e.g., output mesh). FIG. 3 illustrates an example of generating first depth data without a loss on surface normals 310, which includes jagged lines that would result in non-smooth surfaces in the 3D scan.

To improve the depth estimates and smooth corresponding surfaces in the 3D scan, the first model attempts to infer local surface geometry by including a loss on surface normals. Surface normals play a critical role in defining a relationship between a surface and its appearance. Therefore, by including the loss on surface normals (e.g., L1 loss on normals) in an optimization equation of the first model, the system 100 may estimate detailed body geometry without any depth supervision. For example, the front normal 232 (e.g., surface normal at the first position on the front surface 212) may be compared to an estimated surface normal for the first position. FIG. 3 illustrates an example of the system 100 generating second depth data with a loss on surface normals 320 in the optimization function, which results in depth estimated that are smooth and capture a lot of detail.

As used herein, a surface normal indicates an orientation of the surface of the user 5 at a particular position and can be calculated directly based on the depth data using a fixed function (e.g., the first model is not trained to calculate the surface normals). For example, the surface normal for a particular position may be represented using a normalized vector having three channels (e.g., x-y-z coordinate values) that indicate a direction that the surface is pointing at the particular position. The first model may calculate the surface normal using a grid of pixel values (e.g., 3×3 grid, 6×6 grid, etc.) centered on the particular position, although the disclosure is not limited thereto and the surface normal may be generated using any technique known to one of skill in the art. To illustrate simple examples, if the surface is pointing to the right along the x-axis the first model may generate a first surface normal represented by a first normalized vector (1, 0, 0), whereas if the surface is pointing to the left along the x-axis the first model may generate a second surface normal represented by a second normalized vector (−1, 0, 0).

As a smooth surface has a relatively consistent orientation, neighboring pixels along the smooth surface should have relatively similar surface normals. By including the loss on surface normals, the first model generates distance estimates with less variation between neighboring pixels, which results in smoother (e.g., less wrinkly) surfaces in a corresponding 3D scan. Thus, the first model is introducing an additional penalty to the optimization function that makes the estimated distance values more smooth and the 3D scan more lifelike. In some examples, the system 100 may generate the depth data using the loss on surface normals without the loss on depth, although the disclosure is not limited thereto.

Figure 4:
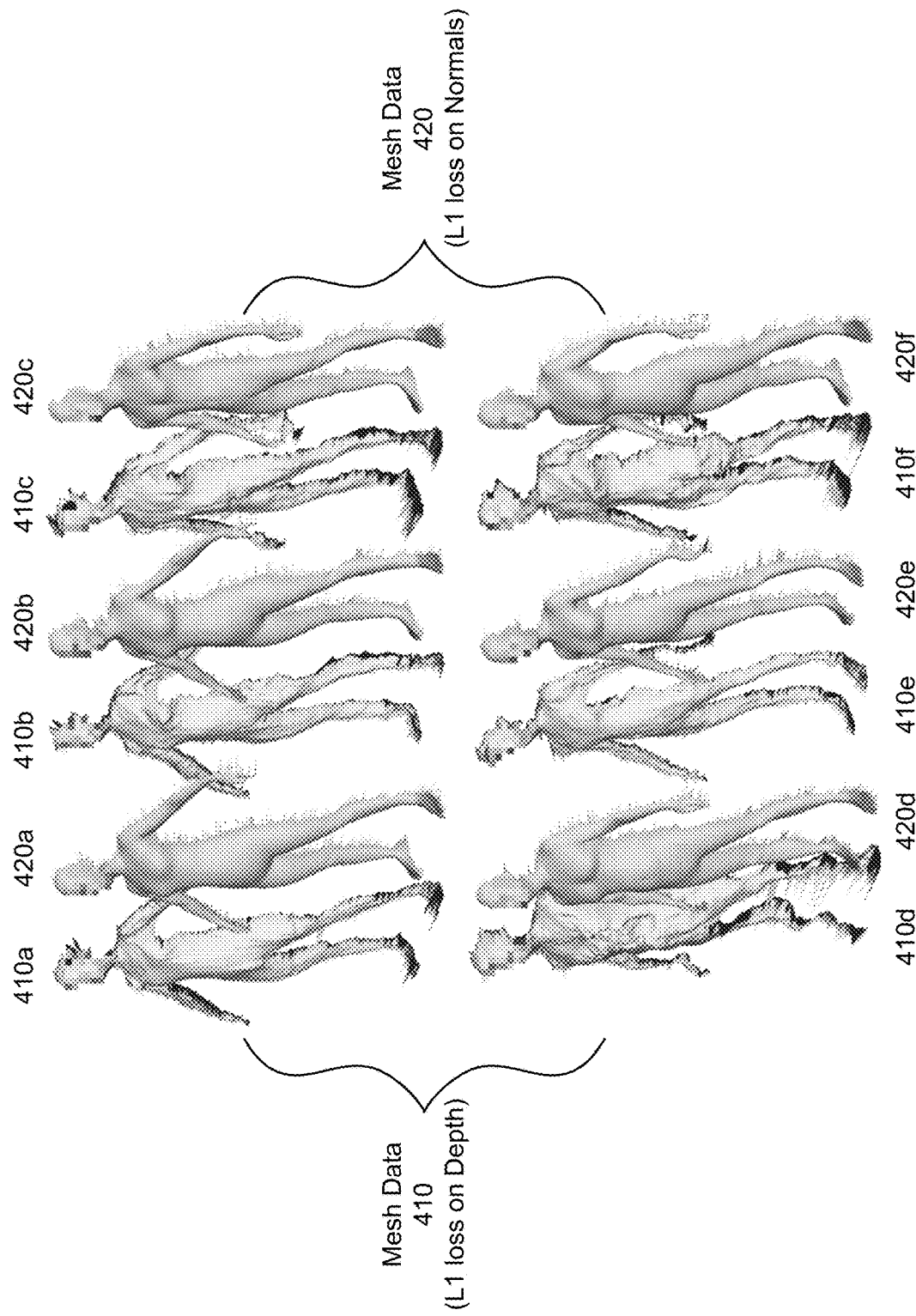
FIG. 4 illustrates examples of output meshes generated using different models according to embodiments of the present disclosure.

FIG. 4 illustrates examples of output meshes generated using different models according to embodiments of the present disclosure. As illustrated in FIG. 4, first mesh data 410 is generated using a least absolute deviations (L1) loss on depth, whereas second mesh data 420 is generated using an L1 loss on surface normals. While FIG. 4 only illustrates six different examples (e.g., a-f), the second mesh data 420a-420f is clearly smoother and more lifelike than the first mesh data 410a-410f.

Figure 5:
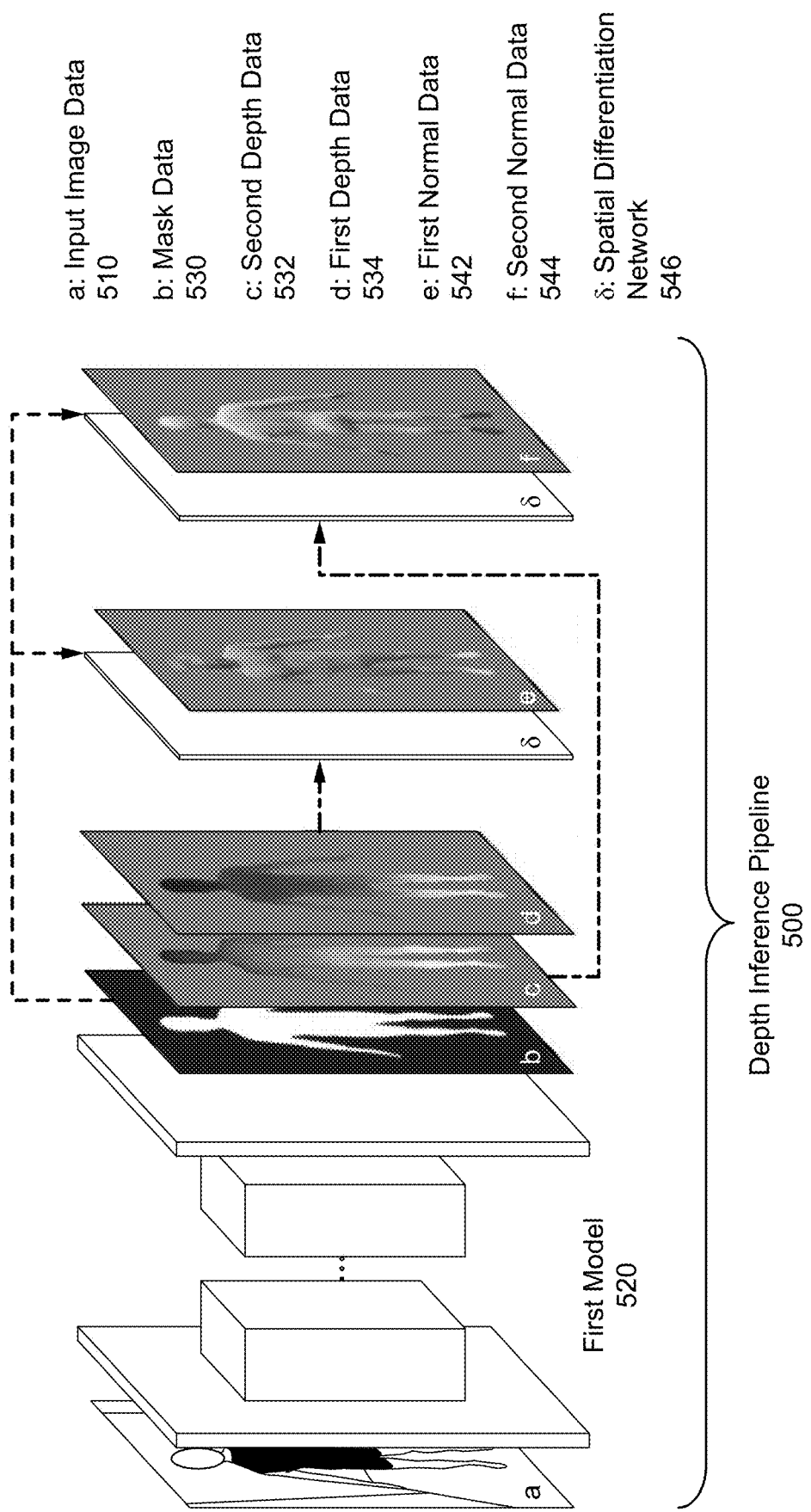
FIG. 5 illustrates a depth inference pipeline according to embodiments of the present disclosure.

FIG. 5 illustrates a depth inference pipeline according to embodiments of the present disclosure. As noted above, if a user requests that the system prepare a 3D model of an object (for example, a 3D model of the user's body for shopping or other user purposes), he/she may provide the system with (or request that the system capture) a two-dimensional input image. As illustrated in FIG. 5, the system 100 may generate depth data by processing input image data 510 ("a") using a first model 520. For example, the first model 520 may process the input image data 510 and output first depth data 534 ("d") (e.g., front depth data) and second depth data 532 ("c") (e.g., back depth data).

As illustrated in FIG. 5, the system 100 may represent the depth data using two separate images; for example, the second (e.g., back) depth data 532 may correspond to image data representing first estimated distance values associated with the back surface 214, while the first (e.g., front) depth data 534 may correspond to image data representing second estimated distance values associated with the front surface 212. However, the disclosure is not limited thereto and the system 100 may represent the depth data using two channels in a single image without departing from the disclosure. For example, the first model 520 may output image data that includes a first channel representing the first estimated distance values and a second channel representing the second estimated distance values. Additionally or alternatively, the estimated distance values may be represented as floating point values in the image data, although the disclosure is not limited thereto.

As part of generating the depth data, the first model 520 may generate mask data 530 ("b") that distinguishes pixels associated with the user 210 from background pixels in the input image data 510. For example, the first model 520 may determine that the user 210 is represented in a plurality of pixels in the input image data 510 and may generate the mask data 530 to indicate the plurality of pixels. Thus, the mask data 530 may be used to indicate where the depth estimates are valid (e.g., associated with the user 210) when generating the 3D scan of the user 210.

The system 100 may use the mask data 530, the second depth data 532, and the first depth data 534 to generate first (e.g., front) normal data 542 ("e") and second (e.g., back) normal data 544 ("f"). For example, the first model 520 may generate the first normal data 542 ("e") and the second normal data 544 ("f") using a spatial differentiation network 546 ("δ") that converts the depth into surface normal values using the following equation:

$$G_n^i = \delta(G_d^i, G_m, f) \quad [1]$$

where i denotes front or back, $G_n^i$ denotes the surface normal value for the front or back, δ denotes the spatial differentiation, $G_d^i$ denotes the depth value for the front or back, $G_m$ denotes the mask data 530, and f denotes the focal length f associated with the camera 112. The spatial differentiation depends on the focal length f to correct perspective distortion associated with the camera 112. The focal length f may be considered fixed, although the disclosure is not limited thereto and the focal length may vary without departing from the disclosure.

The spatial differentiation network 546 may incorporate the mask data 530 to ensure that the first model 520 does not differentiate through boundaries. In areas where depth is not valid (e.g., pixels do not represent the user 210), the first model 520 may generate a constant surface normal value, and these pixels may be ignored when generating the 3D scan of the user 210. Thus, the system 100 may use the mask data 530 to limit the domain of valid depth information to isolate the user 210 and/or object represented in the input image data 510 (e.g., without the mask data 530, the first model 520 would be configured to generate depth data throughout the entire input image data 510).

While FIG. 5 illustrates the system 100 generating the mask data 530 in order to isolate a specific object represented in only a portion of the input image data 510 (e.g., user 210), the disclosure is not limited thereto and in some examples the system 100 may not generate the mask data 530 without departing from the disclosure. For example, the system 100 may train the first model 520 to generate the depth data without isolating the user 210 or other object from the rest of the input image data 510 without departing from the disclosure. Additionally or alternatively, the system 100 may train the first model 520 to generate depth data corresponding to the entire image represented by the input image data 510 without departing from the disclosure. For example, the system 100 may generate depth data corresponding to an environment (e.g., room or scene represented in the input image data 510) that includes multiple objects instead of isolating a single object. Thus, the system 100 may optionally generate the mask data 530 to define a portion of the input image data 510 that is relevant to generating the output data, but the disclosure is not limited thereto.

The first model 520 may implement the spatial differentiation network 546 using fixed layers with a local difference filter, enabling the first model 520 to calculate the front normal data 542 and the back normal data 544 without extra computational cost incurred by explicit integration to determine detailed surface normal values. As illustrated in FIG. 5, the first model 520 may place the spatial differentiation network 546 layer behind the estimated surface normal layers (e.g., front normal data 542 and back normal data 544), implicitly forcing the previous result to correspond to depth. This allows the first model 520 to infer depth even in the absence of depth ground truth data. Thus, the system 100 calculates the front normal data 542 and the back normal data 544 to penalize certain properties of the depth estimates generated by the first model 520, enabling the first model 520 to focus on local detail instead of a global idea of depth. For example, by defining a loss on surface normals, the system 100 is implicitly defining a loss on depth using the spatial differentiation network 546. Thus, the back depth data 532 and the front depth data 534 represents not just a position of the user 210, but also curvature and orientation of the user 210.

The first model 520 may define and minimize a series of objective functions to estimate depth values and/or recover a geometry of the user 210. Recovering the geometry of the user 210 does not benefit from adversarial loss, as the adversarial loss introduces noise when applied to the problem of depth and normal estimation, while also reducing robustness to unseen conditions. For this reason, the depth $\mathcal{L}_d$ and surface normal $\mathcal{L}_n$ terms of the geometry estimation objective replace the adversarial loss with an L1 loss, as shown below:

$$\mathcal{L}_n^i(x,y) = \mathcal{L}_{L1}(y, G_n^i) + \lambda_{VGG} \mathcal{L}_{VGG}(y, G_n^i) \quad [2]$$

$$\mathcal{L}_d^i(x,y) = \mathcal{L}_{L1}(y, G_d^i) \quad [3]$$

where i denotes front or back, y denotes a real image, G denotes a generated image, $\mathcal{L}_n^i$ denotes the surface normal loss, $\mathcal{L}_{L1}(y, G_n^i)$ denotes the L1 loss on surface normals, $G_n^i$ denotes the surface normal value, $\lambda_{VGG}$ denotes a parameter associated with a particular convolutional neural network (CNN) developed by Visual Geometry Group (e.g., pre-trained VGG19 network), $\mathcal{L}_{VGG}$ denotes a perceptual loss determined using the VGG19 network, $\mathcal{L}_d^i$ denotes the depth loss, $\mathcal{L}_{L1}(y, G_d^i)$ denotes the L1 loss on depth, and $G_d^i$ denotes the depth estimate value. Since depth contains a single channel, $\mathcal{L}_{VGG}$ is not applicable. The total loss can potential include this geometric loss applied to normals and/or depth, as well as binary cross entropy loss on the mask output:

$$\mathcal{L}_{full}(x,y) = \lambda_d(\mathcal{L}_d^f + \mathcal{L}_d^b) + \lambda_n(\mathcal{L}_n^f + \mathcal{L}_n^b) + \lambda_{msk} \mathcal{L}_{msk}(y_m, G_m) \quad [4]$$

While the above description produces per-pixel depth values, these are inherently incomplete and lack any semantic meaning (e.g., where is the nose, elbow, etc. of the user 210). To improve the depth data, the system 10 may adopt a mesh alignment process to infer the non-visible (e.g., unobserved surface(s) 216) parts of the body geometry based on a statistical model of human shape and pose (e.g., statistical body model). For example, the system 100 may process the back depth data 532 and the front depth data 534 to generate an output mesh and/or avatar. Thus, the system 100 may capture a fixed scan (e.g., back depth data 532 and front depth data 534) and then effectively transfer knowledge of the depth information from the scan over to an output mesh and/or avatar using the statistical body model.

The alignment process deforms a set of free body vertices (referred to as the mesh) so that they are close to a point-cloud inferred using the techniques described above (referred to as the scan), while also being likely according to the statistical body model. The system 100 may minimize a loss composed of a weighted average of a scan-to-mesh distance term $E_s$, a face landmark term $E_{face}$, two pose and shape priors $E_{pose}$ and $E_{shape}$, and a new term that couples the inferred free vertices with the model $E_{cpl}$.

Es penalizes the squared 3D distance between the scan and closest points on the surface of the mesh. $E_{face}$ penalizes the squared 3D distance between detected face landmarks on the image (in implicit correspondence with the scan) and pre-defined landmark locations in the statistical body model. $E_{cpl}$ encourages the mesh, which can deform freely, to stay close to the model implied by the optimized pose and shape parameters. $E_{pose}$ and $E_{shape}$ regularize pose and shape of the coupled model by penalizing the Mahalanobis distance between those statistical body model parameters and their Gaussian distributions inferred from the statistical body model datasets.

The system 100 may not be able to recover the user's scale accurately. Since the statistical body model cannot fit scan at arbitrary scales, the system 100 may first scale the scan to a fixed height before optimizing the mesh, then apply the inverse scale to the optimized mesh, returning it to the original reference frame. When training the first model 520, the loss on depth acts as a global constraint, enforcing that the front and back scans be estimated at consistent scales. When the loss on depth is omitted during training, the front and back scale are not necessarily coherent, and thus the system 100 may optimize their relative scale during mesh alignment. This can be accomplished by introducing a single additional free scale variable that is applied to the back vertices and optimized along with the mesh.

In order to accurately represent the user 210, the system 100 may also estimate color information with which to apply to the 3D scan. For example, the system 100 may use techniques known to one of skill in the art to estimate color information of the user 210 based on the input image data. Estimating the color information may be referred to as albedo estimation or albedo inference, which is a known problem in computer vision.

Figure 6:
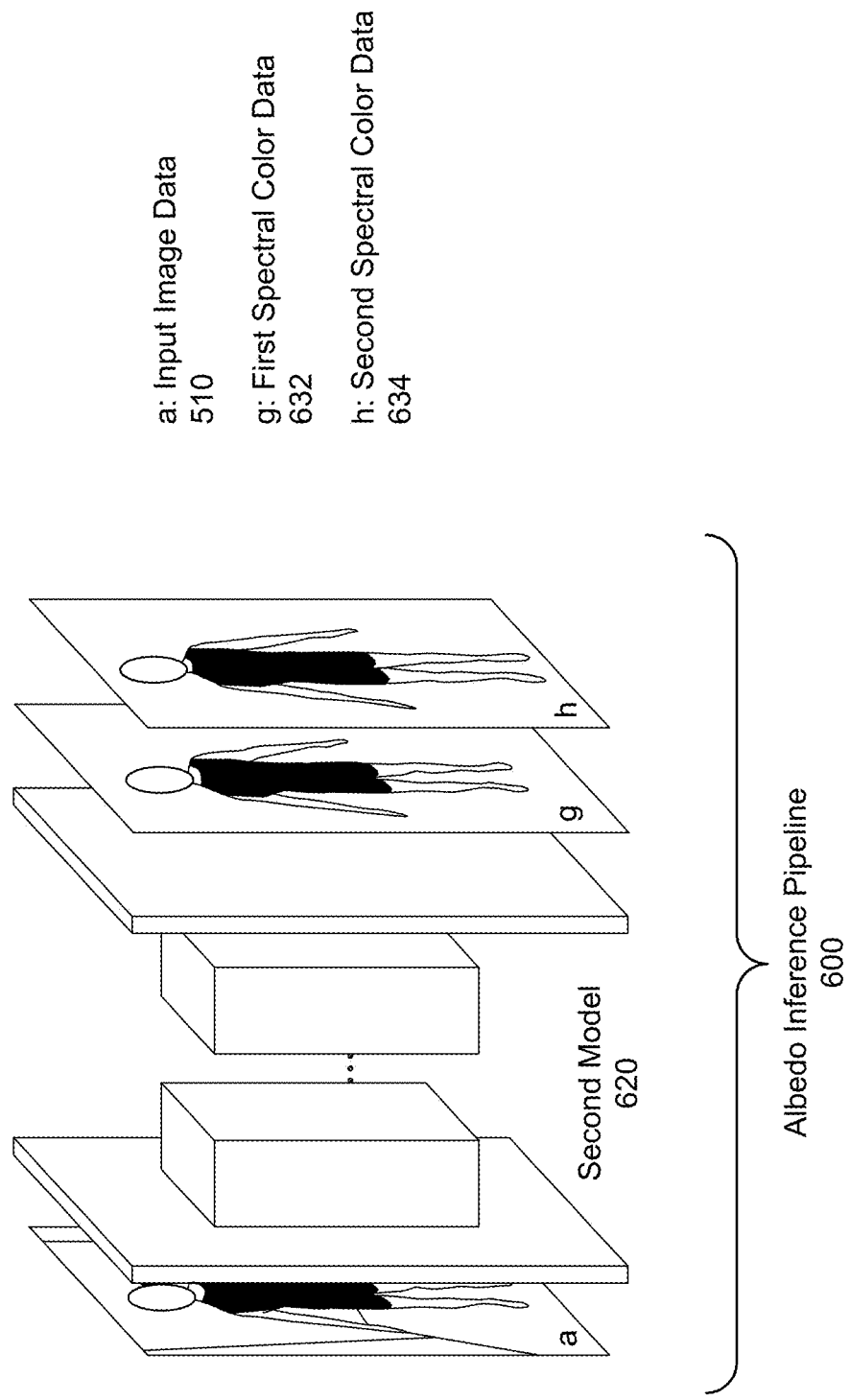
FIG. 6 illustrates an albedo inference pipeline according to embodiments of the present disclosure.

FIG. 6 illustrates an albedo inference pipeline according to embodiments of the present disclosure. As illustrated in FIG. 6, the system 100 may generate color data by processing input image data 510 ("a") using a second model 620. For example, the second model 620 may process the input image data 510 and output first (e.g., front) spectral color data 632 ("g") and second (e.g., back) spectral color data 634 ("h"). As illustrated in FIG. 6, the system 100 may represent the color data using two separate images; the front color data 632 representing first color values associated with the front surface of the user 210 and the back color data 634 representing second color values associated with the back surface of the user 210. The image data may include three channels corresponding to Red, Green, Blue (RGB) values, which may be represented as integer values, although the disclosure is not limited thereto.

The second model is trained to perform color estimation from a single image and may be referred to as a trained model, a deep neural network, and/or a machine learning model without departing from the disclosure. For example, the second model may be trained using a plurality of training images (collectively, training data) in order to accurately estimate the color data based only on pixel values included in the input image data. Similar to the first model, the second model hypothesizes the back side of the user 5 based on the input image data.

A loss function used by the second model 620 may include three terms: an adversarial loss $\mathcal{L}_{GAN}$, which uses a multi-scale discriminator with a specific objective; a feature matching loss $\mathcal{L}_{FM}$, which penalizes discrepancies between the internal discriminator activations when evaluated on the generated G v. real images y; and a perceptual loss, $\mathcal{L}_{VGG}$, which uses the pre-trained VGG19 network described above and measures the different VGG activations from real and generated images.

$$\mathcal{L}_{alb}(x,y^i) = \mathcal{L}_{GAN}(x,y^i,G^i) + \lambda_{FM} \mathcal{L}_{FM}(x,y^i,G_i) + \lambda_{VGG} \mathcal{L}_{VGG}(y^i,G^i)$$ [5]

$$\mathcal{L}_{full}(x,y) = \mathcal{L}_{alb}(x,y^f) + \mathcal{L}_{alb}(x,y^b)$$ [6]

where i denotes front or back, y denotes a real image, G denotes a generated image. The total loss is the sum of losses applied to front and back. Thus, given synthetic training data of images and the corresponding front and back albedo, the second model 620 estimates G with six channels corresponding to the two albedo sets.

The color data generated by the second model 620 corresponds to an estimate of albedo for the user 5 or other object(s) (e.g., articles of clothing) represented in the input image data 510. As used herein, albedo refers to an intrinsic color value associated with an object, after compensating for shadows, additional lighting, specular highlights, and/or other lighting adjustments that may be present in the input image data (e.g., material color in diffuse lighting conditions with no shadows). For example, the system 100 may generate the same color data when processing first image data representing a brightly lit scene and second image data representing a dark scene, despite the actual color values of the first image data being different than the second image data. For ease of explanation, the following description may refer to the estimate of albedo as color information or color data, despite the estimate of albedo being different from the actual pixel values represented in the input image data.

Figure 7:
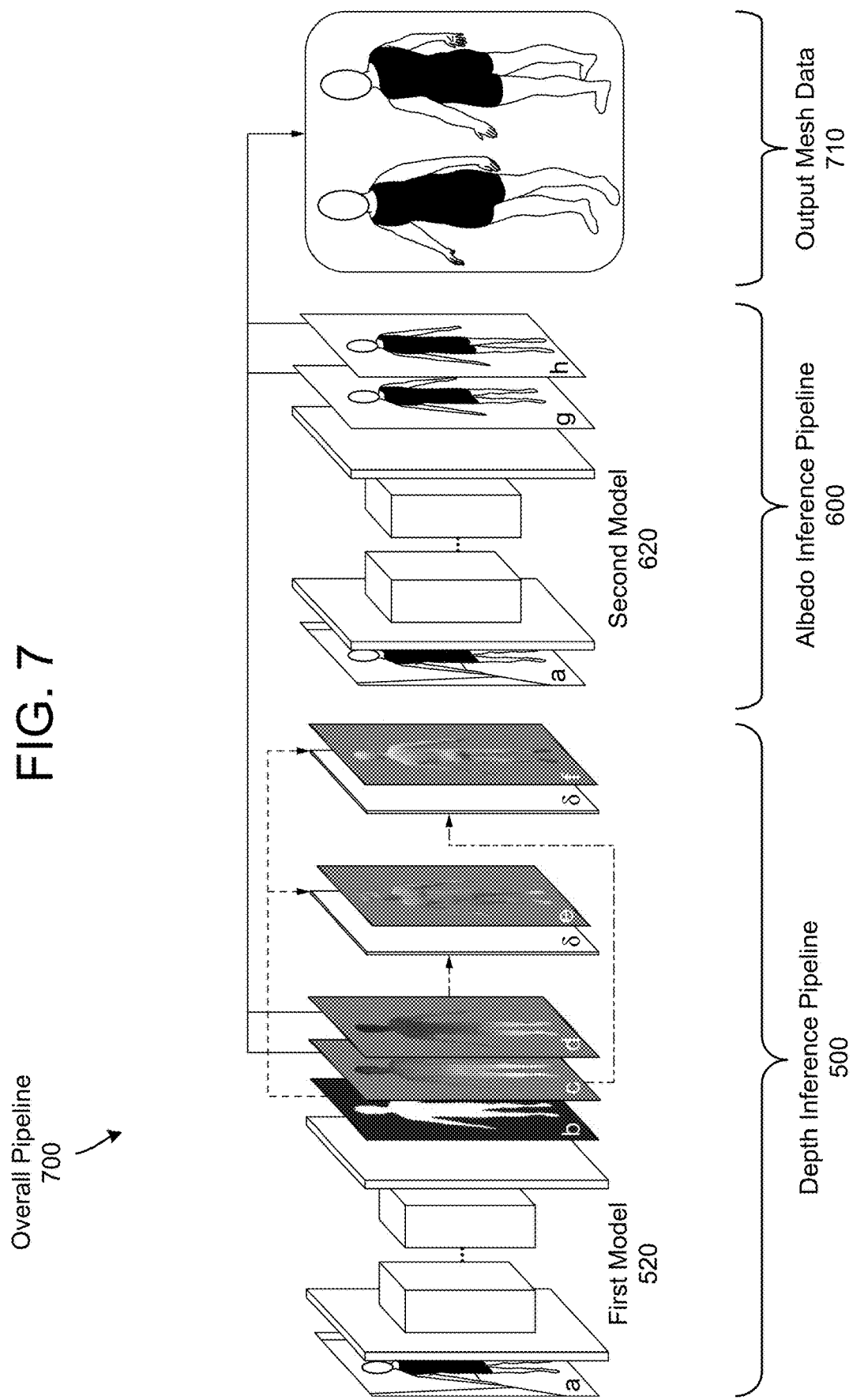
FIG. 7 illustrates an overall pipeline according to embodiments of the present disclosure.

FIG. 7 illustrates an overall pipeline according to embodiments of the present disclosure. As illustrated in FIG. 7, the overall pipeline 700 may include the depth inference pipeline 520 (including the first model 520) described above with regard to FIG. 5 and the albedo inference pipeline 600 (including the second model 620) described above with regard to FIG. 6. Using the back depth data 532 ("c"), the front depth data 534 ("d"), the front color data 632 ("g") and the back color data 634 ("h"), the system 100 may generate output mesh data 710 that corresponds to a three-dimensional (3D) model of the user 210.

To illustrate an example, the system 100 may combine the front depth data 534 and the front color data 632 to estimate a front portion of the output mesh data 710 and may combine the back depth data 532 and the back color data 634 to estimate a back portion of the output mesh data 710. In some examples, the system 100 may scale the front portion to the back portion or vice versa, and may combine the front portion and the back portion in order to generate the output mesh data 710. However, the disclosure is not limited thereto and the system 100 may generate the output mesh data 710 using any technique known to one of skill in the art.

Additionally or alternatively, the system 100 may generate intermediate representation data corresponding to the depth data and/or the color data and may send the intermediate representation data to a remote device for further processing. For example, the intermediate representation data may combine the depth data and the color data into a single image. Thus, the system 100 may generate output image data that includes two channels for the depth data (e.g., first channel representing the first estimated distance values included in the back depth data 532 and a second channel representing the second estimated distance values included in the front depth data 534), three channels for the front color data 632 (e.g., third channel representing red intensity values, fourth channel representing green intensity values, and fifth channel representing blue intensity values), and three channels for the back color data 634 (e.g., sixth channel representing red intensity values, seventh channel representing green intensity values, and eighth channel representing blue intensity values). The system 100 may use the output image data to generate the output mesh data 710 using techniques known to one of skill in the art without departing from the disclosure.

As the system 100 generates the depth data and/or color data using image to image translation networks, a complexity and/or processing consumption associated with generating the output mesh data 710 is reduced compared to conventional techniques. Therefore, the system 100 may generate the output mesh data 710 faster and with less computational consumption than conventional techniques. While FIG. 1 illustrates the remote system 120 generating the output data, the disclosure is not limited thereto and in some examples a local device 110 may generate the output data without departing from the disclosure. For example, the local device 110 may include a graphics processing unit (GPU) (not illustrated) and may generate the output data in a first amount of time, although the disclosure is not limited thereto and the local device 110 may generate the output data in a second amount of time longer than the first amount of time without the benefit of the GPU.

Figure 8:
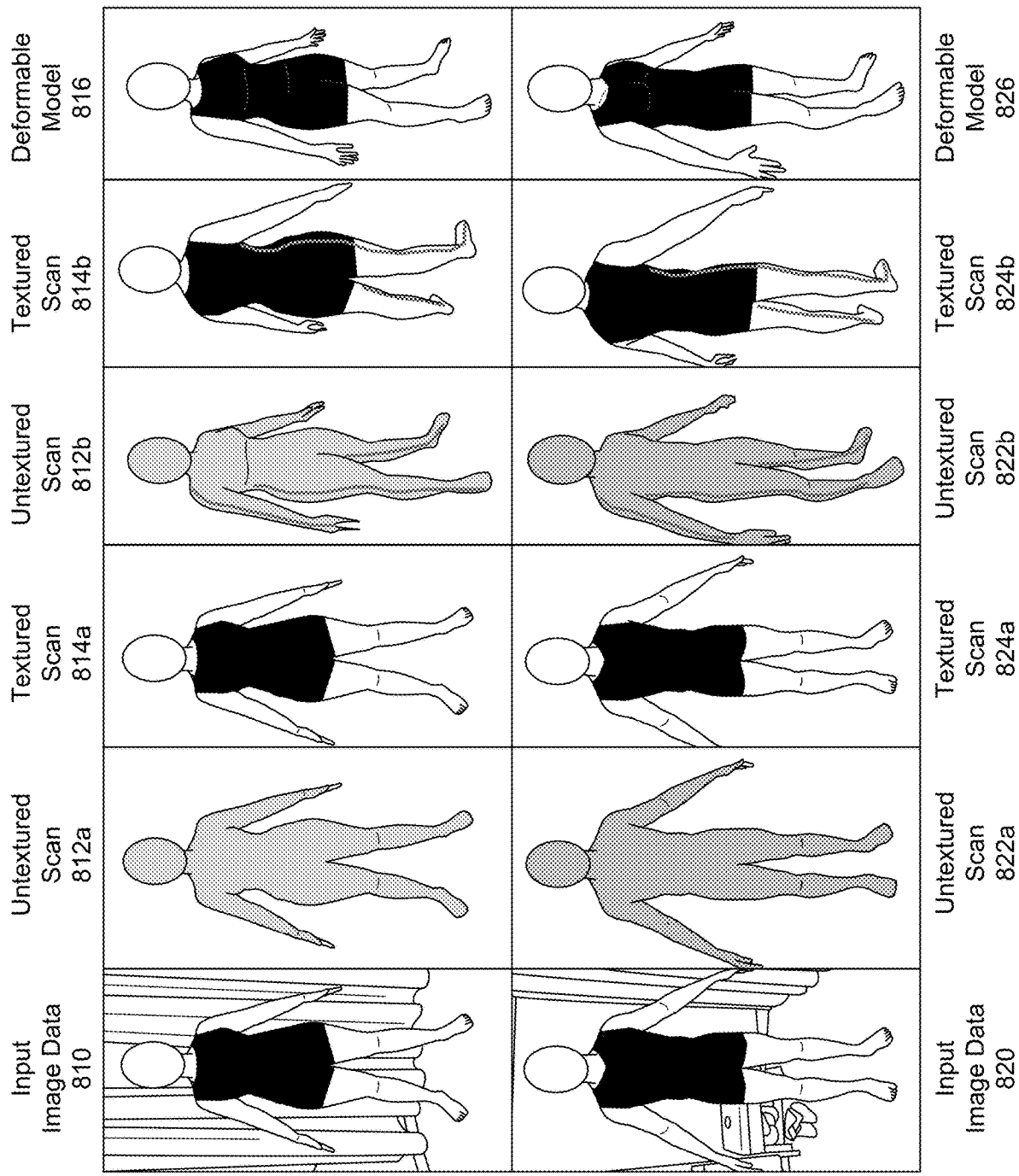
FIG. 8 illustrates examples of input image data, scans, and a deformable model according to embodiments of the present disclosure.

FIG. 8 illustrates examples of input image data, scans, and a deformable model according to embodiments of the present disclosure. As illustrated in FIG. 8, the system 100 may receive first input image data 810 (e.g., RGB image data) of a first person and may generate a first untextured scan 812a (e.g., without albedo texture), a first textured scan 814a (e.g., with albedo texture), a second untextured scan 812b (e.g., without albedo texture), a second textured scan 814b (e.g., with albedo texture), and/or a deformable model 816.

As illustrated in FIG. 8, the untextured scans 812a-812b represent a shape of the first person from two different angles without any color information (e.g., albedo texture). In contrast, the textured scans 814a-814b represent the shape of the first person from the two different angles while including color information. As the scans are generated using a first image corresponding to a front surface of the first person and a second image corresponding to a back surface of the first person, the scans include seams at a junction between the front surface and the back surface of the first person. Due to the different angles of view, these seams are not visible in the first untextured scan 812a and the first textured scan 814a, but are represented as thick grey lines in the second untextured scan 812b and the second textured scan 814b.

As part of generating the deformable model 816, the system 100 may account for the seams and fit the deformable model 816 to a statistical body model. Thus, the deformable model 816 does not include any seams or other discontinuities. While FIG. 8 illustrates the deformable model 816 represented using the color information, the disclosure is not limited thereto and the system 100 may generate the deformable model 816 without texture, similar to untextured scans 812a-812b, without departing from the disclosure.

Similarly, the system 100 may receive second input image data 820 (e.g., RGB image data) of a second person and may generate a first untextured scan 822*a* (e.g., without albedo texture), a first textured scan 824*a* (e.g., with albedo texture), a second untextured scan 822*b* (e.g., without albedo texture), a second textured scan 824*b* (e.g., with albedo texture), and/or a deformable model 826.

As illustrated in FIG. 8, the untextured scans 822*a*-822*b* represent a shape of the second person from two different angles without any color information (e.g., albedo texture). In contrast, the textured scans 824*a*-824*b* represent the shape of the second person from the two different angles while including color information. As the scans are generated using a first image corresponding to a front surface of the second person and a second image corresponding to a back surface of the second person, the scans include seams at a junction between the front surface and the back surface of the second person. Due to the different angles of view, these seams are not visible in the first untextured scan 822*a* and the first textured scan 824*a*, but are represented as thick grey lines in the second untextured scan 822*b* and the second textured scan 824*b*.

As part of generating the deformable model 826, the system 100 may account for the seams and fit the deformable model 826 to a statistical body model. Thus, the deformable model 826 does not include any seams or other discontinuities. While FIG. 8 illustrates the deformable model 826 represented using the color information, the disclosure is not limited thereto and the system 100 may generate the deformable model 826 without texture, similar to untextured scans 822*a*-822*b*, without departing from the disclosure.

For ease of illustration, FIG. 8 illustrates examples of the input image data 810/820 representing a person wearing a single article of clothing that covers a majority of the torso. However, the disclosure is not limited thereto and the system 100 may generate scans and/or deformable models using input image data representing a person wearing any type and/or number of articles of clothing without departing from the disclosure. While form-fitting clothing will more accurately represent a body shape of the person represented in the input image data, the system 100 may generate scans and/or deformable models using input image data representing the person using non-form fitting clothing without issue. The system 100 may generate color data capturing color information of the person, including both skin tones and each article of clothing, such that the textured scans and/or textured avatar may accurately represent color information of the skin tones and/or the articles of clothing.

FIG. 9 illustrates examples of avatar data and virtual image data according to embodiments of the present disclosure. As described above, the system 100 may process input image data 910 to generate depth information, which may be used to generate an output mesh shaped like a person, such as a reposable human avatar. As illustrated in FIG. 9, the reposable human avatar is represented as avatar data 920, which may include detailed geometry and appearance of the person represented in the input image data 910. This process may be referred to as avatar extraction, which may be useful for gaming, virtual telepresence, virtual shopping (e.g., clothing size prediction, virtual fitting rooms, etc.) and other implementations. The reposable human avatar represented by the avatar data 920 may be graphically presented on an output device (e.g. computer monitor, hand-held screen, television, etc.) in either static or animated form, although the disclosure is not limited thereto.

In some examples, an avatar or output mesh may be optionally clothed with virtual garments. For example, FIG. 9 illustrates processing input image data 930 to generate virtual image data 940 used to try on virtual clothing. There are several computer graphics methods, including commercial products, for simulating clothing draped on 3D bodies that are known to one of skill in the art and therefore not discussed here. For example, the body model can be saved in any one of the common graphics model formats and imported into a standard clothing simulation software system.

Virtual try on is enabled by collecting a database of models of different shapes and sizes wearing a plurality of clothing items. When the user wants to see how they will look in a particular clothing item, the database of stored models is searched for the closest matching body shape for which an image (or graphic representation) of the model in that item exists. This image is then displayed to the user. In this way, each person visiting a retail clothing website may see the same merchandise but on different models (models that look most like them). This provides the equivalent of a personalized clothing catalog for the person's shape. This is a form of "example-based virtual clothing." Rather than rendering clothing using graphics, many images of models are stored and recalled as needed, although the disclosure is not limited thereto.

While FIG. 9 illustrates an example of trying on virtual clothing, the disclosure is not limited thereto and the system 100 may perform additional functionality using the output mesh and/or the virtual image data 940 without departing from the disclosure. In some examples, the system 100 may use the output mesh and/or the virtual image data 940 to determine sizing data corresponding to the person. For example, when the person is shopping for a specific product (e.g., article of clothing or other wearable accessories), the system 100 may use the output mesh to determine a specific size based on specifications (e.g., sizing charts) associated with the product. Additionally or alternatively, in other examples the system 100 may use the output mesh and/or the virtual image data 940 to determine measurement data corresponding to the person. For example, the system 100 may use the output mesh to estimate one or more measurements (e.g., inseam, waist size, shirt size, neck size, arm length, etc.) corresponding to the person, enabling the person to select an appropriate size without obtaining measurements directly.

While the above description refers to estimating a body shape of a human (assuming the individual's permission), the disclosure is not limited thereto and the system 100 may modify the techniques described above to estimate a shape of non-human objects without departing from the disclosure. For example, the system 100 may estimate a size and/or shape of an individual object and/or multiple objects, enabling the system 100 to generate a virtual representation of the user's living room or the like without departing from the disclosure. In order to estimate the size and/or shape of other objects, the system 100 may train a machine learning model (e.g., deep neural network and/or the like) using training data specific to the particular object. For example, the system 100 may train a first trained model using first training data associated with estimating body geometry for a person, may train a second trained model using second training data associated with estimating body geometry for a dog, may train a third trained model using third training data associated with estimating surface geometry for a couch, and so on.

While the above description refers to determining depth data and/or color data corresponding to a front surface and a back surface of a person by processing image data representing a frontal view of the person, this is intended to conceptually illustrate some examples and the disclosure is not limited thereto. Instead, the system 100 may determine depth data and/or color data corresponding to the back surface and the front surface of the person by processing image data representing a back view of the person without departing from the disclosure. Additionally or alternatively, the system 100 may generate depth data and/or color data associated with any two opposing surfaces of an object (e.g., a first surface of the object and a second surface of the object that is opposite to the first surface) without departing from the disclosure. For example, the system 100 may generate first side depth data corresponding to a left side of the object and right side depth data corresponding to a right side of the object without departing from the disclosure. Additionally or alternatively, the system 100 may determine depth data and/or color data for any number of surfaces without departing from the disclosure. For example, given enough training data, the system 100 may determine depth data corresponding to a couch or other object having more than two surfaces along an optic ray.

While the system 100 may acquire training data using any technique known to one of skill in the art, in some examples the system 100 may generate synthetic training data based on the techniques described above. For example, the system 100 may generate multiple 3D models (or other scans) corresponding to one or more people in multiple different poses. Using the multiple 3D models, the system 100 may generate the synthetic training data by adding a representation of one of the 3D models to a generic background. For example, the system 100 may use a set of generic backgrounds to generate a plurality of training images, with varying lighting and/or positions of the 3D models.

Figure 10:
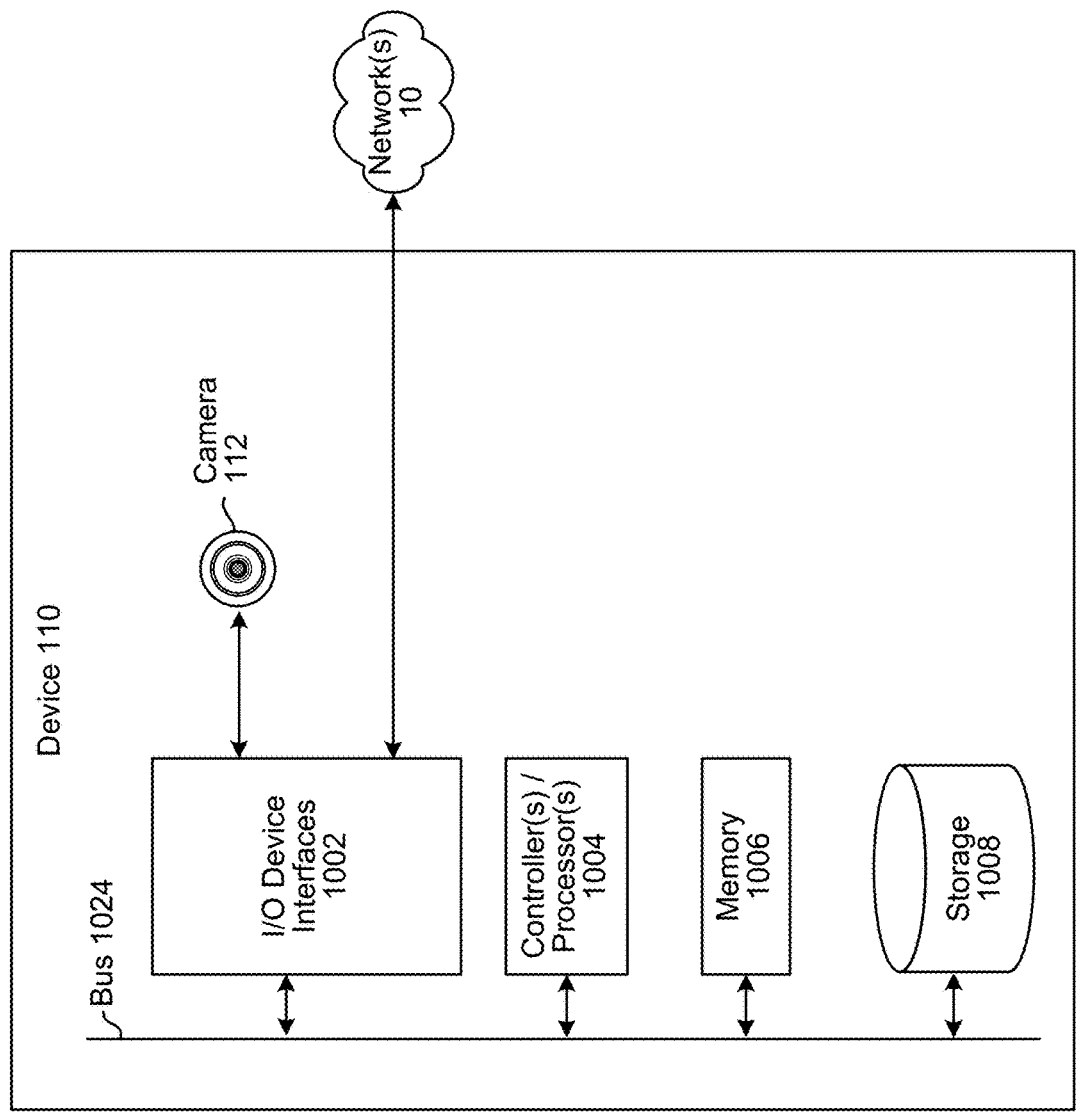
FIG. 10 is a block diagram conceptually illustrating example components of a device according to embodiments of the present disclosure.

FIG. 10 is a block diagram conceptually illustrating a device 110 that may be used with the system. FIG. 11 is a block diagram conceptually illustrating example components of a remote device, such as the remote system 120, which may assist with processing input image data and/or generating output data. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers may be included in the remote system 120. In operation, each of these devices (or groups of devices) may include computer-readable and computer-executable instructions that reside on the respective device (110/120), as will be discussed further below.

Each of these devices (110/120) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1002/1102).

Computer instructions for operating each device (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces (1002/1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to FIG. 10, the device 110 may include input/output device interfaces 1002 that connect to a variety of components such as a camera 112, image sensor (not illustrated), or other component capable of generating image data. The device 110 may additionally include a display (not illustrated) for displaying content, although the disclosure is not limited thereto.

The input/output device interfaces 1002 may connect to one or more networks 10 via a wired and/or wireless connection. Examples of wired connections may include Ethernet, a local area network (LAN), and/or the like. Examples of wireless connections may include a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. Through the network(s) 10, the system 100 may be distributed across a networked environment. The I/O device interface (1002/1102) may also include communication components that allow data to be exchanged between devices such as different physical servers in a collection of servers or other components.

The components of the device 110 and the remote system 120 may include their own dedicated processors, memory, and/or storage. Alternatively, one or more of the components of the device 110 and the remote system 120 may utilize the I/O interfaces (1002/1102), processor(s) (1004/1104), memory (1006/1106), and/or storage (1008/1108) of the device(s) 110 and remote system 120, respectively.

As noted above, multiple devices may be employed in a single system. In such a multi-device system, each of the devices may include different components for performing different aspects of the system's processing. The multiple devices may include overlapping components. The components of the device 110 and the remote system 120, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    receiving, from a camera, input image data representing a first view of an object;
    processing, by a device, the input image data by a first trained model to generate:
        first image data representing first depth information of a first surface of the object, the first image data including first pixel data representing a first distance between the camera and a first position on the first surface of the object, and
        second image data representing second depth information of a second surface of the object, the second image data including second pixel data representing a second distance between the camera and a second position on the second surface of the object;
    processing, by the device, the input image data by a second trained model to generate:
        third image data representing first color information of the first surface of the object, the third image data including third pixel data representing first color values of the first position on the first surface of the object, and
        fourth image data representing second color information of the second surface of the object, the fourth image data including fourth pixel data representing second color values of the second position on the second surface of the object; and
    generating, by the device, output data that includes a three-dimensional (3D) model of the object, a first portion of the 3D model associating the first depth information and the first color information and a second portion of the 3D model associating the second depth information and the second color information.

2. The computer-implemented method of claim 1, wherein processing the input image data by the first trained model further comprises:
    generating mask data indicating a portion of the input image data that includes a representation of the object;
    generating third depth information corresponding to the first surface of the object, the third depth information including a third distance associated with the first position on the first surface of the object;
    determining, using the third depth information and the mask data, surface normal values corresponding to the first surface of the object, the surface normal values including a first vector representing an orientation of the first surface of the object at the first position; and
    generating, using the third depth information and the surface normal values, the first depth information.

3. The computer-implemented method of claim 1, wherein generating the output data further comprises:
    determining a first pixel position corresponding to the first position on the first surface of the object;
    determining, using the first depth information, a first channel value corresponding to the first pixel position, the first channel value representing the first distance;

determining a second channel value corresponding to the first pixel position, the second channel value representing a first intensity of a red component of the first color values;

determining a third channel value corresponding to the first pixel position, the third channel value representing a second intensity of a green component of the first color values;

determining a fourth channel value corresponding to the first pixel position, the fourth channel value representing a third intensity of a blue component of the first color values; and generating the output data by generating the 3D model of the object, a first portion of the output data corresponding to the first position on the first surface of the object and including the first channel value, the second channel value, the third channel value, and the fourth channel value.

4. The computer-implemented method of claim 1, wherein generating the output data further comprises:

determining, using the first depth information, first position data of the 3D model, the first position data representing the first surface of the object using a 3D coordinate system;

determining, using the second depth information, second position data of the 3D model, the second position data representing the second surface of the object using the 3D coordinate system;

determining the first portion of the 3D model by applying the first color information to the first position data of the 3D model, the first portion of the 3D model representing the first position on the first surface of the object using the first color values;

determining the second portion of the 3D model by applying the second color information to the second position data of the 3D model, the second portion of the 3D model representing the second position on the second surface of the object using the second color values; and generating the output data by combining the first portion of the first 3D model and the second portion of the 3D model.

5. A computer-implemented method, the method comprising:

receiving, from a camera, first image data representing a first view of a human;

based on the first image data representing the first view of the human, using a first model to generate, by a device, first depth data corresponding to a first surface of the human, the first depth data including a first distance between the camera and a first position on the first surface of the human;

based on the first image data representing the first view of the human, using the first model to generate, by the device, second depth data corresponding to a second surface of the human opposite to the first surface, the second depth data including a second distance between the camera and a second position on the second surface of the human; and based on the first depth data and the second depth data, generating, by the device, output data corresponding to a three-dimensional representation of the human.

6. The computer-implemented method of claim 5, further comprising:

processing, using a second model, the first image data to generate:

first color data corresponding to the first surface of the human, the first color data including first color values associated with the first position on the first surface of the human, and second color data corresponding to the second surface of the human, the second color data including second color values associated with the second position on the second surface of the human.

7. The computer-implemented method of claim 6, wherein generating the output data further comprises:

determining a first pixel position corresponding to the first position on the first surface of the human;

determining, using the first depth data, a first channel value corresponding to the first pixel position, the first channel value representing the first distance;

determining, using the first color values, a second channel value corresponding to the first pixel position and representing a first intensity value associated with a first primary color;

determining, using the first color values, a third channel value corresponding to the first pixel position and representing a second intensity value associated with a second primary color; and determining, using the first color values, a fourth channel value corresponding to the first pixel position and representing a third intensity value associated with a third primary color, wherein a first portion of the output data corresponds to the first position on the first surface of the human and includes the first channel value, the second channel value, the third channel value, and the fourth channel value.

8. The computer-implemented method of claim 5, further comprising:

determining surface normal values corresponding to the first depth data; and training the first model using a least absolute deviations (L1) loss function of body geometry on the surface normal values.

9. The computer-implemented method of claim 5, further comprising:

generating third depth data corresponding to the first surface of the human, the third depth data including a third distance associated with the first position on the first surface of the human;

determining, using the third depth data, surface normal data corresponding to the first surface of the human, the surface normal data including a first vector representing an orientation of the first surface of the human at the first position; and generating, using the third depth data and the surface normal data, the first depth data.

10. The computer-implemented method of claim 5 further comprising:

generating, using the first image data, second image data including the first depth data, the second image data including a first pixel value corresponding to the first position on the first surface of the human and representing the first distance; and generating, using the first image data, third image data including the second depth data, the third image data including a second pixel value corresponding to the second position on the second surface of the human and representing the second distance.

11. The computer-implemented method of claim 5, wherein generating the output data further comprises:
- determining, using the first depth data and first color data corresponding to the first surface of the human, a first portion of a first three-dimensional (3D) model of the human, the first portion of the first 3D model representing the first surface of the human;
- determining, using the second depth data and second color data corresponding to the second surface of the human, a second portion of the first 3D model, the second portion of the first 3D model representing the second surface of the human; and
- generating the output data by combining the first portion of the first 3D model and the second portion of the first 3D model.

12. The computer-implemented method of claim 11, further comprising:
- receiving an indication of an object;
- determining a second 3D model representing the object; and
- generating, using the first 3D model and the second 3D model, a third 3D model representing the human and the object.

13. A system comprising:
- at least one processor; and
- memory including instructions operable to be executed by the at least one processor to cause the system to:
  - receive first image data representing a first view of a human;
  - based on the first image data representing the first view of the human, using a first model to generate first depth data corresponding to a first surface of the human, the first depth data including a first distance between a camera and a first position on the first surface of the human;
  - based on the first image data representing the first view of the human, using the first model to generate second depth data corresponding to a second surface of the human opposite to the first surface, the second depth data including a second distance between the camera and a second position on the second surface of the human; and
  - based on the first depth data and the second depth data generating output data corresponding to a three-dimensional representation of the human.

14. The system of claim 13, wherein the memory further comprises instructions that, when executed by the at least one processor, further cause the system to:
- process, using a second model, the first image data to generate:
  - first color data corresponding to the first surface of the human, the first color data including first color values associated with the first position on the first surface of the human, and
  - second color data corresponding to the second surface of the human, the second color data including second color values associated with the second position on the second surface of the human.

15. The system of claim 14, wherein the memory further comprises instructions that, when executed by the at least one processor, further cause the system to:
- determine a first pixel position corresponding to the first position on the first surface of the human;
- determine, using the first depth data, a first channel value corresponding to the first pixel position, the first channel value representing the first distance;
- determine, using the first color values, a second channel value corresponding to the first pixel position and representing a first intensity value associated with a first primary color;
- determine, using the first color values, a third channel value corresponding to the first pixel position and representing a second intensity value associated with a second primary color;
- determine, using the first color values, a fourth channel value corresponding to the first pixel position and representing a third intensity value associated with a third primary color; and
- generate the output data by generating a three-dimensional (3D) model of the human, a first portion of the output data corresponding to the first position on the first surface of the human and including the first channel value, the second channel value, the third channel value, and the fourth channel value.

16. The system of claim 13, wherein the memory further comprises instructions that, when executed by the at least one processor, further cause the system to:
- determine surface normal values corresponding to the first depth data; and
- train the first model using a least absolute deviations (L1) loss function of body geometry on the surface normal values.

17. The system of claim 13, wherein the memory further comprises instructions that, when executed by the at least one processor, further cause the system to:
- generate third depth data corresponding to the first surface of the human, the third depth data including a third distance associated with the first position on the first surface of the human;
- determine, using the third depth data, surface normal data corresponding to the first surface of the human, the surface normal data including a first vector representing an orientation of the first surface of the human at the first position; and
- generate, using the third depth data and the surface normal data, the first depth data.

18. The system of claim 13, wherein the memory further comprises instructions that, when executed by the at least one processor, further cause the system to:
- generate, using the first image data, second image data including the first depth data, the second image data including a first pixel value corresponding to the first position on the first surface of the human and representing the first distance; and
- generate, using the first image data, third image data including the second depth data, the third image data including a second pixel value corresponding to the second position on the second surface of the human and representing the second distance.

19. The system of claim 13, wherein the memory further comprises instructions that, when executed by the at least one processor, further cause the system to:
- determine, using the first depth data and first color data corresponding to the first surface of the human, a first portion of a first three-dimensional (3D) model of the human, the first portion of the first 3D model representing the first surface of the human;
- determine, using the second depth data and second color data corresponding to the second surface of the human, a second portion of the first 3D model, the second portion of the first 3D model representing the second surface of the human; and generate the output data by combining the first portion of the first 3D model and the second portion of the first 3D model.

20. The system of claim 19, wherein the memory further comprises instructions that, when executed by the at least one processor, further cause the system to:
receive an indication of an object;
determine a second 3D model representing the object; and
generate, using the first 3D model and the second 3D model, a third 3D model representing the human and the object.

21. The computer-implemented method of claim 5, wherein the three-dimensional representation corresponds to an avatar representing the human.

* * * * *